3,558,329
PROCESS FOR PRESERVING MELONS
Alfred G. Hess, Santee, Calif., assignor to Hess Research and Development Corporation, a corporation of California
No Drawing. Filed July 1, 1968, Ser. No. 741,259
Int. Cl. A23b 7/16
U.S. Cl. 99—154                             3 Claims

ABSTRACT OF THE DISCLOSURE

A process for preserving melons by treating them with tetraiodoethylene, either with or without a pre-treatment step with a bacteriostat, and by covering the treated melons with a sealed and relatively close fitting cover or bag member which is water proof or water resistant, whereby the melons have an extended life of at least four to five times their usual life expectancy in the absence of such treatment.

BACKGROUND OF THE INVENTION

(1) Field of the invention

This invention relates to a new process for the preservation of melons by treating them with tetraiodoethylene, with or without a preliminary pre-treatment with a bacteriostat, and followed by keeping the treated melons in a waterproof or water resistant container, which is referred to hereinafter as close or tight bagging. The process may or may not use a bacteriostat, such as penicillin G, or sodium hypochlorite.

(2) Prior art

Applicant knows of no prior art making use of tetraiodoethylene in the treatment of melons for the purpose of preserving them for a much longer period of time than they would normally last in the absence of any such treatment.

SUMMARY OF THE INVENTION

The invention comprises a new process for the preservation of melons by treating them with a water suspension of tetraiodoethylene, with or without a preliminary treatment step using a bacteriostat, and then wrapping and sealing the melons while wet with a suitable container which is waterproof and presents a barrier to water either entering or leaving the container.

The term "melons used in this patent application refers to various types of *Cucumis melo,* and includes cantelopes, crenshaw melons, honeydew melons, and other closely related varieties.

In general, the melons are treated by spraying or submerging them in a water suspension of tetraiodoethylene for a time sufficient to thoroughly wet the outside surface of the melon, and then by wrapping and sealing the melons either individually, or in bulk, in a suitable material which is waterproof.

A bacteriostat of various types may be used in water solution or suspension, either by submerging or spraying, as a pre-treatment step to the treatment with tetraiodoethylene and the bagging.

The effect of this new process is to prolong the life of melons for as much as five times their usual or expected life in the absence of such treatment.

My process is applicable to any fruit of the type having a pachycarpous covering, i.e., a relatively thick pericarp or exterior covering. Melons are specific examples of such fruit.

It is, therefore, an object of this invention to provide a process for treating pachycarpous fruit such as melons to extend substantially their useful life over what it would be in the absence of such treatment.

Another object of this invention is to provide a process for treating pachycarpous fruit to extend the useful life thereof, which process is relatively easy to perform.

A further object of this invention is to provide a process for treating pachycarpous fruit such as melons, which process uses relatively inexpensive materials.

These and other objects will be more readily understood by reference to the following description and claims.

The following is an example of the use of my new process.

EXAMPLE 1

Upon ripening, a number of melons were selected and were treated by my new process by being immersed in an aqueous suspension of tetraiodoethylene for a period of time of about 5 minutes. The tetraiodoethylene suspension had an approximate concentration of about 1 gram per liter of water. This mixture was in the form of a slurry.

While still wet with the tetraiodoethylene suspension, the melons were removed from the tetraiodoethylene suspension and placed in individual bags made of polyethylene. The bags were sealed and thereafter, the bagged melons were kept at a temperature of 10° C., (45° F.), throughout the remainder of their life after treatment. Observation of these treated melons indicated that their useful life was extended substantially. These treated melons were still edible up to 50 days after treatment. On the other hand, control melons which were untreated and also kept at 10° C. had a life of only 10 to 12 days.

EXAMPLE 2

A quantity of ripe melons was immersed in a water suspension of tetraiodoethylene for a period of about 5 minutes. After this period of time, the melons were removed from the tetraiodoethylene suspension and while still wet, were individually wrapped in a relatively close fitting polyethylene bag. The tetraiodoethylene suspension had an approximate concentration of about 1 gram per liter of water, and was in the form of a slurry. After being wrapped, the treated melons were sealed in the bags and were kept thereafter in a temperature of 2° C. or 35° F. Observation thereafter indicated that these treated melons had a useful life, i.e., were edible, for a period of over 56 days after treatment.

In comparison, untreated control melons were kept at the same temperature, 2° C., had a useful life of only 15 days.

A pre-treatment step of beginning the above process by subjecting the melons to the action of a bacteriostat had the effect of increasing the useful life of the treated melons, as shown by the following example.

EXAMPLE 3

The bacteriostat chosen for this example was a water solution of sodium hypochlorite. 4 tablespoons of 5% sodium hypochlorite solution were added per gallon of water used as the immersing solution for this pre-treatment step. A quantity of ripe melons was first immersed in this sodium hypochlorite solution for a period of about 5 minutes. Immediately thereafter, the melons were removed, and while still wet, immersed in a water suspension of tetraiodoethylene for a period of about 5 minutes. Immediately thereafter and while still wet, the melons were individually wrapped in relatively close fitting polyethylene bags. After this treatment, the bagged melons were sealed in their bags, and kept at a temperature of 2° C. These melons had a useful life and were edible for a period of time of over 76 days.

Similar results were obtained when the pre-treated step used penicillin G instead of sodium hypochlorite solution. The penicillin G solution was equally effective as the hypochlorite solution at a concentration of about one million units of penicillin G to a gallon of water, or about 50 parts per million of penicillin G.

Immersion of the melons requires no particular length of time, so long as the surface of the melon is thoroughly wet, either with the water suspension of tetraiodoethylene or, if used with the water solution of a bacteriostat. Thus, in my process, the period of time for treatment may be as low as a second, and up to 5 or more minutes, depending on the wetting procedure.

Also, any form of producing a wet surface of the melon may be used, such as spraying of the water suspension of tetraiodoethylene or of the water solution of the bacteriostat. The only requirement is that the outer surface of the melon becomes thoroughly wet and remains wet at the time of bagging.

Any suitable material may be used to wrap the melons, such as various plastics, or any other suitable material, that is water resistant or waterproof. The material must be able to prevent the escape of water from the interior of the bag, since the outer surface of the melon should remain wet throughout its life after treatment with the tetraiodoethylene suspension followed by bagging and sealing.

The concentration of the water suspension of tetraiodoethylene may also be varied within reasonable limits. Thus, the concentration of tetraiodoethylene may vary from 0.1 gram to as much as 5 grams or more per liter, without adversely affecting the results of my process. Similarly, the concentration of sodium hypochlorite may vary from a minimum of about 500 parts per million to a maximum of 5000 parts per million or more. Also, the concentration of penicillin G may vary from 5 parts per million up to 250 parts per million and more.

Further, the melons need not be individually wrapped. They may be wrapped in bulk, that is, a plurality of melons may be wrapped together with a suitable material and sealed without adversely affecting the results of my process.

Various types of bacteriostat may be used so long as they are non-toxic and have no adverse effect on the melons. Thus, any bacteriostat that is non-toxic and will avoid any destruction of the tissue of the melons would be a suitable material for use as a bacteriostat.

Moreover, my process is equally effective at various storage temperatures in comparison to the life expectancy of melons that are untreated. Thus, within the range of ambient temperatures commonly used for storage of melons my process will substantially extend the life of the melons over what it would be without my treatment, at various temperatures such as 2° C., 10° C., 20° C., 30° C., and so forth.

Although I have described my invention with respect to preferred embodiments herein, it is understood that the scope of the invention is not to be limited thereby, but numerous variations in conditions and procedures are possible without departing from the spirit and scope of the invention as claimed hereinafter.

I claim:

1. A process for preserving pachycarpous fruit, comprising, treating the fruit with an aqueous solution of a bacteriostat, wetting the outer surface of the fruit with an aqueous suspension of tetraiodoethylene, and sealing the fruit while still wet inside a waterproof wrapping, whereby the life of the fruit is substantially extended.

2. A process according to claim 1 in which the bacteriostat is penicillin G.

3. A process according to claim 1 in which the bacteriostat is sodium hypochlorite.

References Cited

UNITED STATES PATENTS

| | | | |
|---|---|---|---|
| 2,607,694 | 8/1952 | Rinck | 99—153 |
| 2,828,210 | 3/1958 | Keller | 99—154X |
| 3,008,839 | 11/1961 | Brunsing et al. | 99—193 |
| 3,034,903 | 5/1962 | Cothran | 99—154 |
| 3,090,817 | 5/1963 | Schmerling | 260—648 |
| 3,234,296 | 2/1966 | D'Addieco et al. | 260—654 |
| 3,189,468 | 6/1965 | Kalmar | 99—168 |
| 3,359,257 | 12/1967 | Farhi et al. | 260—211.5 |
| 3,376,141 | 4/1968 | Delgado et al. | 99—154 |

OTHER REFERENCES

Merck Index, p. 1027.

NORMAN YUDKOFF, Primary Examiner

F. E. DRUMMOND, Assistant Examiner

U.S. Cl. X.R.

99—168, 171, 193; 260—211.5; 424—271